United States Patent Office 2,804,433
Patented Aug. 27, 1957

2,804,433

PRODUCTION OF SILICA-ALUMINA COMPOSITES

George L. Hervert, Downers Grove, and Herman S. Bloch, Chicago, Ill., assignors to Universal Oil Products Company, Des Plaines, Ill., a corporation of Delaware No Drawing. Application December 29, 1952, Serial No. 328,508

2 Claims. (Cl. 252—453)

This invention relates to a novel method of preparing silica-alumina composites and in particular to a method of preparing these composites in a manner to obtain a composite of high purity in a desirable form.

Silica-alumina composites have long been used as catalysts or as supports for catalytic materials such as chromium, molybdenum, tungsten, iron, nickel, cobalt, platinum, palladium, etc., in either metallic form or as compounds thereof such as the oxides or the sulfides. Composites of this nature are characterized by exhibiting extremely large surface areas per unit of volume and having large absorptive capacities. By using a base such as a silica-alumina composite, a relatively expensive active catalytic material may be used in extremely small quantities whereas otherwise large quantities of the expensive catalytic material would be needed if it were used alone. For example, a silica-alumina-platinum catalyst may contain from about 0.10% to about 1% or more by weight of platinum. By properly associating an active metal or combination of active metals with a base, the metal may be disposed in extremely subdivided form, approaching atomic size. An active material in this form exhibits extremely large surface areas per unit of weight. Since catalytic effects are largely surface effects and since a finely subdivided catalyst has an extremely large surface area per unit of weight, a great saving in active material can be realized by disposing it on a suitable base. Since many catalytically active materials are rare or noble metals, the use of these metals with silica-alumina as a base material greatly reduces the cost of the catalyst and thereby makes the use of many catalytic materials practical. Silica-alumina composites may be used as catalysts in themselves in many reactions, particularly the conversion of hydrocarbon oils, and find further use as desiccants, adsorbents, decolorizers, refractories, etc.

Silica-alumina composites may be found in nature or may be synthetically prepared. Many natural silica-alumina clays are found and may be used as adsorbents or catalysts after suitable purification and activation such as by acid treating and calcining and other similar methods. Synthetically prepared silica-alumina, however, is superior to natural silica-alumina in that it exhibits better catalytic qualities which are largely due to the more purified form in which it exists. Many methods are used for preparing silica-alumina composites synthetically which fall generally into two classifications. The first is the impregnation method wherein a gelable hydrous sol of silica is prepared, converted to a gel, and subsequently impregnated with a soluble salt of aluminum, which upon treatment with a mildly basic medium becomes aluminum hydroxide which may be converted to alumina by treatment with heat. The second is the cogellation method which generally comprises preparing a gelable sol of silica and an aluminum salt, gelling the resultant mixture and subsequently calcining to produce the desired composite. In both of the above methods, a great deal of difficulty is experienced in obtaining a final product with the proper characteristics. The materials of which the gels are made and the manner in which they are gelled are extremely critical. Furthermore, complex methods of manufacture and equipment are required in order to produce synthetic composites by either of these techniques.

It is an object of this invention to provide a novel process for the production of silica-alumina composites of high purity and desirable physical characteristics.

As hereinbefore stated the silica-alumina composites may be used as catalysts per se or in combination with other active materials and may be used to effect many reactions including cracking of relatively high boiling hydrocarbons by contacting the material to be cracked with the catalyst at a temperature of from about 700° F. to about 1200° F. or more and a pressure of from atmospheric to about 1500 p. s. i. or more, reforming a gasoline fraction by contacting it with the catalyst at a temperature of from about 600° F. to about 1000° F. and a pressure of from about 50 p. s. i. to about 1000 p. s. i. or more in the presence of hydrogen, polymerization of unsaturated hydrocarbons to produce heavier hydrocarbons, alkylation of hydrocarbons to produce heavier hydrocarbons, dealkylation of t-alkyl and sec-alkylaromatics, alkyl transfer reactions as, for example, the reaction of benzene and xylene to produce toluene, hydrogen transfer reactions, treating reactions wherein small quantities of impurities are removed as, for example, desulfurization of gasoline, oxidation reactions as, for example, the manufacture of alcohols, aldehydes, acids, etc., hydration and dehydration reactions, hydrogenation and dehydrogenation reactions, etserification reactions and many others.

Alumina or aluminum hydrate occurs in various modifications, the more common types of alumina being the following:

Alpha-alumina, often known as corundum, is the form stable at temperature over about 1800° F.

Gamma-alumina is very stable but changes to alpha-alumina at temperatures above about 1800° F.

Epsilon-alumina is the alumina formed in thin films on the surface of metallic aluminum during oxidation by dry or wet air or oxygen.

Gamma-$Al_2O_3 \cdot 3H_2O$ or Gibbsite is prepared by aging Böhmite in a cold basic solution.

Alpha-$Al_2O_3 \cdot 3H_2O$ or Bayerite is also formed by aging Böhmite in a cold basic solution but is unstable and gradually is transformed into Gibbsite.

Gamma-$Al_2O_3 \cdot H_2O$ or Böhmite may be prepared in a variety of ways, one of the simplest being the addition of ammonium hydroxide to a water solution of aluminum chloride. The material originally preciptated is an amorphous alumina floc which rapidly grows to crystal size yielding crystalline Böhmite. Aging of Böhmite in ammonium hydroxide solution transforms the Böhmite first to meta-stable Bayerite and finally into stable Gibbsite.

Alpha-$Al_2O_3 \cdot H_2O$ or Diaspore occurs abundantly in nature.

In the specification and claims the word alumina will mean one or more of these various modifications either as anhydrous alumina or aluminum hydrate unless otherwise specifically noted.

By varying the conditions of the process of this invention it will be shown that some of the various modifications of alumina as hereinbefore described may be obtained composited with silica.

We have discovered and our invention broadly comprises an improved method for preparing a silica-alumina composite by reacting aluminum metal with water, in the presence of sodium meta silicate under specific conditions. Hydrogen in a very pure state is a by-product of this reaction. The aluminum to be used in our process may be any commercially available aluminum, although, when a high purity product is desired, it is preferred to start with a high purity aluminum. It is within the scope of this invention to use aluminum alloys; however, since the present process will produce pure silica-alumina composites, it is preferred to use aluminum of 99.5% purity or greater in the reaction.

Aluminum will react with water under specific conditions to directly produce alumina. The rate of reaction of aluminum with water may be considerably accelerated by the addition of a suitable catalyst. The preferred catalyst has been found to be basic nitrogen compounds which are particularly suitable since they catalyze the reaction and leave no residual material that is difficult to remove. We have found that another extremely suitable catalytic material is sodium meta silicate which not only catalyzes the reaction between aluminum and water but furthermore, when treated under the proper conditions, yields a composite of silica-alumina which has extremely uniform distribution of silica and alumina and is furthermore in an extremely desirable form. This novel process directly produces silica-alumina in particulated form which requires no aging or treating in any manner and minimizes trouble from sols, gels, flocs, etc., which normally add greatly to the problems of manufacture of such composites.

In one embodiment of the present invention a silica-alumina composite is prepared by reacting aluminum metal with water in the presence of sodium meta silicate.

In a preferred embodiment of the present invention a silica-alumina composite is produced by reacting subdivided aluminum with water in the presence of sodium meta silicate, maintaining a sufficient pressure on the reactants to keep at least a portion of the water in the liquid phase, agitating and acidifying the mixture, and separately recovering a silica-alumina composite therefrom.

In a specific embodiment of the present invention a silica-alumina composite is produced by agitating subdivided aluminum with water containing from about 0.1% to about 90% by weight of sodium meta silicate at a temperature of from about 32° F. to about 705° F. and under sufficient pressure to maintain the water in liquid phase, acidifying the resultant mixture, washing, separately recovering a silica-alumina composite and calcining the recovered composite at a temperature of from about 750° F. to about 1400° F. whereby a product comprising active silica-alumina is obtained.

The catalyst of this invention is sodium meta silicate which is a specific compound having the formula $Na_2SiO_3$ or $Na_2SiO_3 \cdot 9H_2O$ and not water glass, which is a loose combination of alkali metal and silicon dioxide having the formula $Na_2O \cdot xSiO_2$ where $x$ is between 2 and 4. Water glass is specifically excluded as a catalyst for this invention.

The rate at which the reaction of aluminum and water is effected depends upon the temperature of the reactants, the degree of subdivision of the aluminum, the amount of agitation given the mixture and the amount of catalyst present. Thus a reaction that proceeds slowly at a temperature of 212° F. and mild agitation will proceed very rapidly when the mixture is vigorously agitated. At a temperature of 550° F. on the other hand, the reaction proceeds very rapidly even with mild agitation. It may be seen that when it is desired to change the reaction rate, any of the above described variables may be changed. In the process of this invention it is preferred that the water in the reaction zone is in the liquid phase and it is readily seen that when temperatures above about 212° F. are used the reaction must proceed under sufficient pressure to maintain at least a portion of the water in the liquid phase. Although it is not intended to limit this invention to the use of water in the liquid phase, it is highly desirable that liquid water is used in that more intimate contact of the reactants may be effected in the liquid phase.

Although the temperature range in which the reaction may be effected is from the freezing point of water to the critical temperature of water, the temperature at which the reaction is effected is important in determining the final form of the silica-alumina composite. In the lower range of temperatures, for example from about 32° F. to about 160° F., a composite is produced which is in extremely finely divided form. A silica-alumina composite that is produced for example, at 100° F. will be produced directly in the form of an impalpable powder which requires no further attrition or grinding. As the temperature of the reaction is increased the particle size of the resultant product will be increasingly larger. Reactions effected at a relatively low temperature produce Gibbsite alumina. When the reaction is effected at 400° F. the product is primarily Gibbsite, but at this temperature traces of Böhmite are present. As the temperature of the reaction is increased above 400° F. the amount of Böhmite in the product is accordingly increased and at a temperature of approximately 600° F. the product of the reaction is substantially Böhmite. Although various forms of alumina may be produced from the process of this invention, the ultimate calcined product will always be active silica-alumina.

The product formed in the reaction zone by the process of this invention is a distinct material from the aluminum in the reaction zone. It is not necessary, in fact it is extremely undesirable, in the process of this invention to scrape or cut the product from the aluminum reactant. When the process is carried out as hereinbefore described the aluminum metal exists as the metal in the reaction zone and the product that is formed is pure product in distinct particles completely separate from the reacting aluminum. The alumina-silica composite that is formed in the reaction zone is in the form of crystals of varying size as distinct from a gel or floc. Even when the reaction is effected to form extremely small crystals there is no difficulty in washing or filtering the product in that they form a particulated filter bed rather than a gelatinous clogging mass. No aging or soaking periods are required to adjust the physical characteristics of the product; it is necessary only to neutralize or slightly acidify the mixture, wash, filter, dry and calcine to obtain the product in its final form. Some degree of flocculation usually occurs on acidification, but the mixture may still be filtered with no greater difficulty than is normally experienced with precipitated silica gel alone.

When the reaction of aluminum and water is not complete and it is necessary to separate metallic aluminum from the alumina-silica product, this may be readily done by any of the techniques used to separate particles of different size or density. Generally the only separation that is required is to pass the stream from the reaction zone through a screen whose openings are designed to pass silica-alumina crystals and to hold aluminum. If the aluminum and the crystals are of substantially the same size, flotation methods may be easily employed since the densities of the two substances are sufficiently different.

The product from the process of this invention is well suited to be used in fluidized processes, moving bed processes, slurry type processes or fixed bed processes. When employed in any of these processes the product may be used as produced or it may be formed into shapes such as spheres, pills, cylinders, etc. For fixed bed processes it is particularly desirable to pill the catalyst since a pilled catalyst allows a process to operate without excessive pressure drops across the catalyst bed.

Any suitable apparatus may be used for the process of this invention. For temperatures above about 212° F., a particularly suitable apparatus comprises a pressure vessel fitted with an agitating means and a vent through which the hydrogen by-product may be vented to reduce the pressure in the reaction zone. It may be noted here that the hydrogen by-product is in an extremely pure form suitable for many uses.

Following are three examples which are presented to further illustrate the process of this invention but which are not intended to unduly limit the invention to the particular process or materials used. Examples I and II illustrate the reaction of aluminum and water in the presence of sodium meta silicate. Example III illustrates the process carried out in the presence of water glass.

*Example I*

500 ml. of distilled water and 142.1 grams of sodium meta silicate ($Na_2SiO_3 \cdot 9H_2O$) were placed in a 2 liter flask fitted with a stirring device and heated. When the mixture reached a temperature of 212° F., 18.0 grams of aluminum (99.9% pure) in the form of chips was charged to the flask and a vigorous reaction resulted. The reaction proceeded for 110 minutes after which it was complete as evidenced by the absence of aluminum metal in the product. The product was acidified with sulfuric acid and filtered from the supernatant liquid. The product was then washed with 0.1% ammonium sulfate solution, dried at about 300° F. and calcined at about 900° F. The resultant composite was substantially pure silica-alumina having an alumina content of approximately 51% by weight.

*Example II*

500 ml. of distilled water and 59 grams of sodium meta silicate and 18 grams of aluminum were placed in an autoclave fitted with a stirring device and heated to a temperature of 350° F. After 2 hours the autoclave was emptied and the absence of aluminum metal indicated that the reaction had gone to completion. The product was acidified with sulfuric acid, filtered from the supernatant liquid, subsequently washed with water containing 0.1% ammonium sulfate solution, dried at about 300° F. and calcined at about 900° F. The resultant composite was substantially pure silica-alumina having an alumina content of approximately 70%.

*Example III*

The experiment of Example I was repeated except that "N" brand water glass ($1Na_2:3.3SiO_2$) was used instead of sodium meta silicate. No reaction took place; the aluminum appeared completely unattacked even after 20 hours of heating at 212° F. The behavior of sodium meta silicate is thus shown to be considerably different from that of other silicates such as water glass.

As may be seen from the above examples sodium meta silicate is a catalytic substance with regards to this reaction in that when a greater amount of sodium meta silicate is present the reaction may be effected at milder conditions. For ordinary composites sufficient sodium meta silicate will be present in the solution to catalyze the reaction so that it may be effected at reasonable conditions; however, it is contemplated that when a product containing extremely small amounts of silica is desired, an additional catalyst other than sodium meta silicate may be added to the solution. These catalysts will usually be basic nitrogen containing compounds and may include ammonium hydroxide, amines, alkanolamines, etc.

We claim as our invention:

1. The process of producing a silica-alumina composite which comprises reacting aluminum metal with water containing from about 0.1% to about 90% by weight of sodium meta silicate as a catalyst at a temperature of from about 212° F. to about 705° F. under sufficient pressure to maintain an aqueous liquid phase during the reaction and for a sufficient time to convert the metal into alumina, recovering from said reaction a reaction mixture substantially free of unconverted aluminum metal but containing the alumina and said silicate, acidifying said reaction mixture, thereby precipitating silica from the sodium meta silicate, separating resultant silica-alumina particles from the reaction mixture and calcining the same.

2. The process of producing a silica-alumina composite which comprises reacting aluminum metal with water containing from about 0.1% to about 90% by weight of sodium meta silicate as a catalyst at a temperature of from about 212° F. to about 705° F. under sufficient pressure to maintain an aqueous liquid phase during the reaction and for a sufficient time to convert the metal into alumina, recovering from said reaction a reaction mixture substantially free of unconverted aluminum metal but containing the alumina and said silicate, acidifying said reaction mixture, thereby precipitating silica from the sodium meta silicate, separating resultant silica-alumina particles from the reaction mixture, washing the separated particles and calcining the same at a temperature of from about 750° F. to about 1400° F.

References Cited in the file of this patent

UNITED STATES PATENTS

| | | |
|---|---|---|
| 2,249,613 | Kinneberg | July 15, 1941 |
| 2,478,916 | Haensel et al. | Aug. 6, 1949 |
| 2,559,152 | Grosse et al. | July 3, 1951 |